(12) United States Patent
Mahtani

(10) Patent No.: US 12,035,844 B2
(45) Date of Patent: Jul. 16, 2024

(54) TOASTER OVEN SYSTEM AND METHOD

(71) Applicant: INSYNC PRODUCTS GROUP LTD., Sheung Wan (HK)

(72) Inventor: Rishi Mahtani, Kowloon (HK)

(73) Assignee: INSYNC PRODUCTS GROUP LTD., Sheung Wan (HK)

( * ) Notice: Subject to any disclaimer, the term of this patent is extended or adjusted under 35 U.S.C. 154(b) by 0 days.

(21) Appl. No.: 17/679,514

(22) Filed: Feb. 24, 2022

(65) Prior Publication Data
US 2023/0263340 A1 Aug. 24, 2023

(51) Int. Cl.
| | |
|---|---|
| A47J 37/06 | (2006.01) |
| A23L 5/10 | (2016.01) |
| A47J 36/32 | (2006.01) |
| F24C 7/06 | (2006.01) |
| F24C 7/08 | (2006.01) |
| F24C 15/02 | (2006.01) |
| F24C 15/04 | (2006.01) |
| F24C 15/14 | (2006.01) |

(52) U.S. Cl.
CPC ............ *A47J 37/0629* (2013.01); *A23L 5/15* (2016.08); *A47J 36/32* (2013.01); *A47J 37/0664* (2013.01); *F24C 7/067* (2013.01); *F24C 7/087* (2013.01); *F24C 15/02* (2013.01); *F24C 15/023* (2013.01); *F24C 15/024* (2013.01); *F24C 15/04* (2013.01); *F24C 15/14* (2013.01); *A23V 2002/00* (2013.01)

(58) Field of Classification Search
CPC ..... A23V 2002/00; F24C 15/14; F24C 15/04; F24C 15/024; F24C 15/023; F24C 15/02; F24C 7/087; F24C 7/067; A47J 37/0664

USPC .......................................................... 99/352
See application file for complete search history.

(56) References Cited

U.S. PATENT DOCUMENTS

| | | | | |
|---|---|---|---|---|
| 2,875,016 | A * | 2/1959 | Fry .................... | F24C 15/16 312/351 |
| 3,669,004 | A * | 6/1972 | Eaton, Jr. .......... | A47J 37/0623 99/391 |
| 3,682,643 | A * | 8/1972 | Foster ................ | A23L 3/365 426/243 |

(Continued)

FOREIGN PATENT DOCUMENTS

CN 206539232 U 10/2017

OTHER PUBLICATIONS https://hamiltonbeach.com/easy-reach-4-slice-toaster-oven-with-roll-topdoor-31334d.

*Primary Examiner* — Jimmy Chou
(74) *Attorney, Agent, or Firm* — Jacob M. Ward; Ward Law Office LLC

(57) ABSTRACT

A toaster oven system includes a main body, a heating element, a front door, and a top door. The main body has a cooking cavity for holding food, and in which the heating element is disposed. The main body also has a front side and a top side, with the front side defining a front opening of the main body, and the top side defining a top opening of the main body. The front door is hingedly attached to the main body and movable between a closed position and an opened position. The top door is hingedly attached to the main body and movable between a closed position and an opened position. The food is insertable or removable by the user through either the front opening or the top opening when an associated one of the front door and the top door is in the opened position.

18 Claims, 9 Drawing Sheets

(56) References Cited

U.S. PATENT DOCUMENTS

| | | | | |
|---|---|---|---|---|
| 4,476,848 A * | 10/1984 | Protas | A21B 1/52 | |
| | | | 126/339 | |
| 5,549,039 A * | 8/1996 | Ito | A47J 36/12 | |
| | | | 99/403 | |
| 5,726,427 A * | 3/1998 | Hwang | H05B 6/76 | |
| | | | 16/223 | |
| 6,111,226 A * | 8/2000 | Lee | A47J 37/0664 | |
| | | | 219/393 | |
| 6,271,502 B1 * | 8/2001 | Lee | F24C 15/023 | |
| | | | 16/261 | |
| 6,354,193 B1 * | 3/2002 | Lee | A47J 37/0629 | |
| | | | 99/441 | |
| 6,621,053 B1 * | 9/2003 | Wensink | F24C 15/16 | |
| | | | 99/399 | |
| 6,852,953 B1 * | 2/2005 | Lee | A47J 37/0623 | |
| | | | 219/393 | |
| 7,028,372 B2 * | 4/2006 | Eui-Su | E05D 7/1077 | |
| | | | 16/221 | |
| 8,878,106 B2 * | 11/2014 | Hensel | A47J 37/0635 | |
| | | | 219/486 | |
| 9,756,981 B2 * | 9/2017 | Fung | A47J 37/0623 | |
| 9,924,830 B1 * | 3/2018 | Glucksman | A47J 37/0611 | |
| 10,561,274 B2 * | 2/2020 | Huang | A47J 37/015 | |
| 10,591,168 B2 * | 3/2020 | Yang | F24C 15/026 | |
| 11,454,401 B2 * | 9/2022 | Kwag | F24C 7/082 | |
| 11,457,768 B1 * | 10/2022 | Gilmartin | A47J 27/004 | |
| 2009/0107343 A1 * | 4/2009 | De' Longhi | A47J 37/0892 | |
| | | | 99/352 | |
| 2014/0216271 A1 * | 8/2014 | Arling | A47J 37/041 | |
| | | | 99/421 H | |
| 2015/0056355 A1 * | 2/2015 | Cusell | A47J 37/0807 | |
| | | | 426/523 | |
| 2015/0237908 A1 * | 8/2015 | Burkett | A23L 3/3418 | |
| | | | 99/468 | |
| 2018/0266697 A1 * | 9/2018 | Dash | A47J 37/0623 | |
| 2019/0014944 A1 * | 1/2019 | Huang | A47J 37/015 | |
| 2019/0059646 A1 * | 2/2019 | Uno | F24C 7/046 | |
| 2020/0022531 A1 * | 1/2020 | Man | A47J 37/0641 | |
| 2020/0224883 A1 * | 7/2020 | Kim | F24C 7/087 | |
| 2020/0224884 A1 * | 7/2020 | Kwag | F24C 15/02 | |
| 2020/0229276 A1 * | 7/2020 | Kim | H05B 6/129 | |
| 2020/0305641 A1 * | 10/2020 | Swayne | A23L 5/15 | |
| 2021/0353097 A1 * | 11/2021 | Jeong | H05B 6/681 | |
| 2022/0087473 A1 * | 3/2022 | Kim | F24C 7/067 | |
| 2022/0170646 A1 * | 6/2022 | Bianchi | F24C 15/327 | |
| 2022/0397285 A1 * | 12/2022 | Lee | F24C 15/02 | |

* cited by examiner

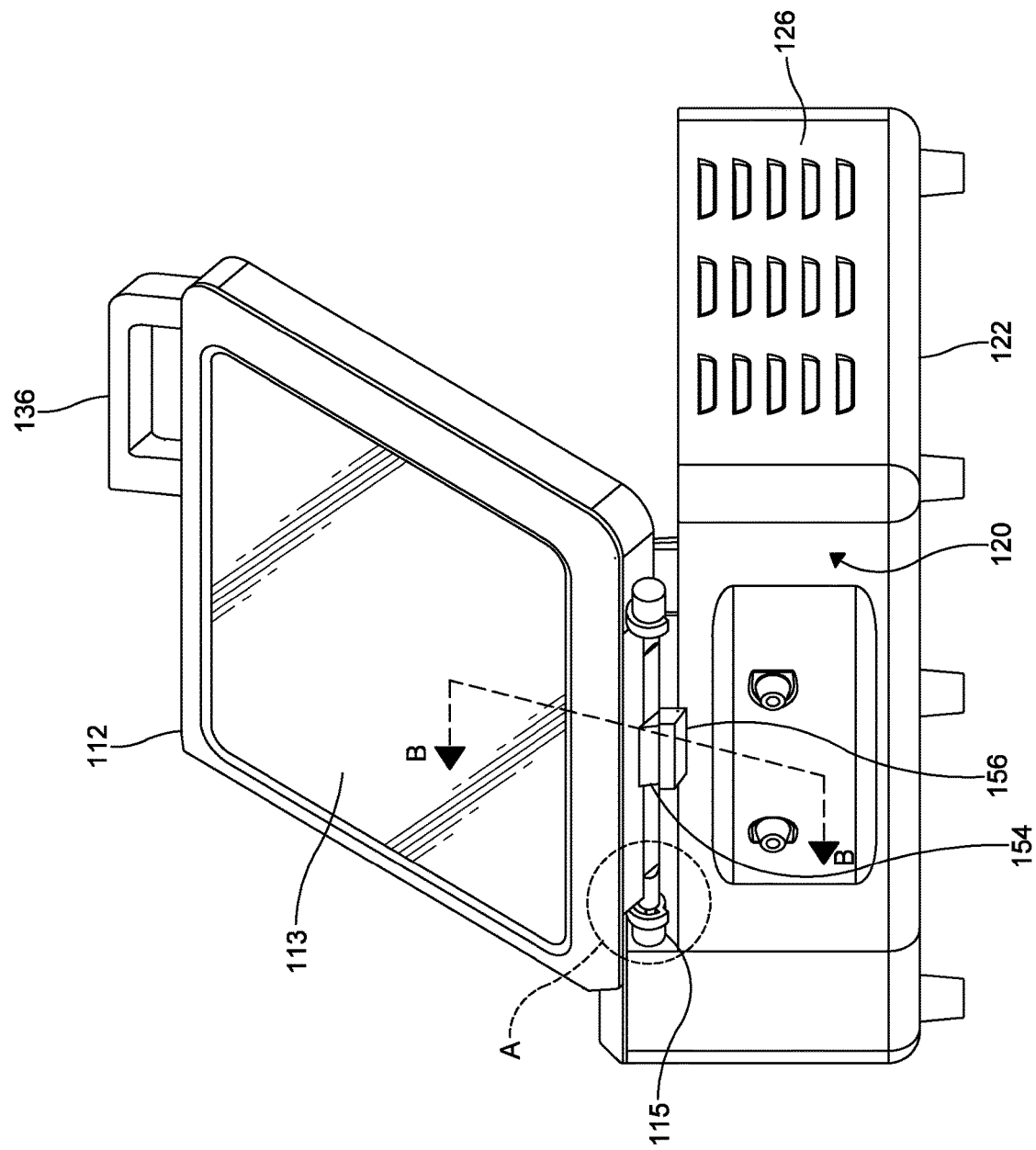

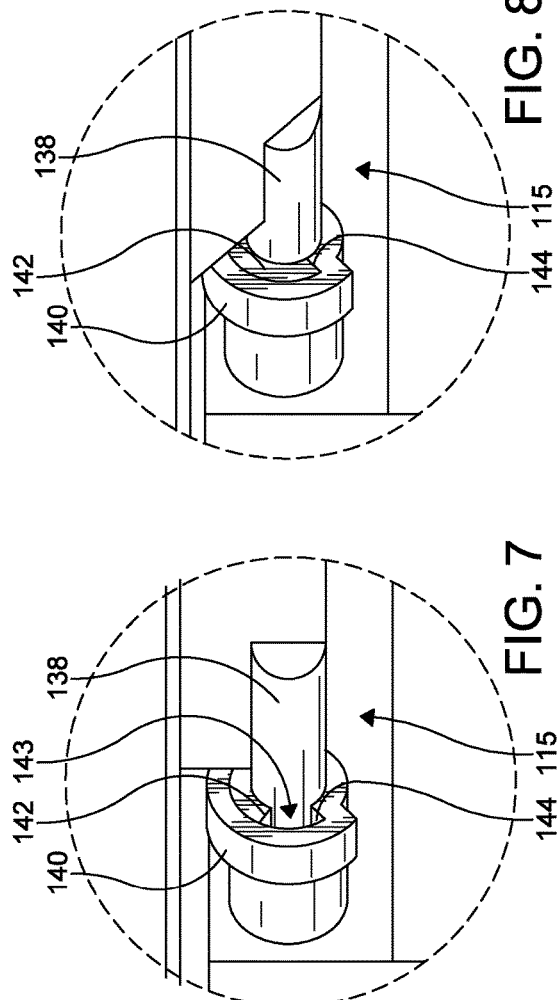
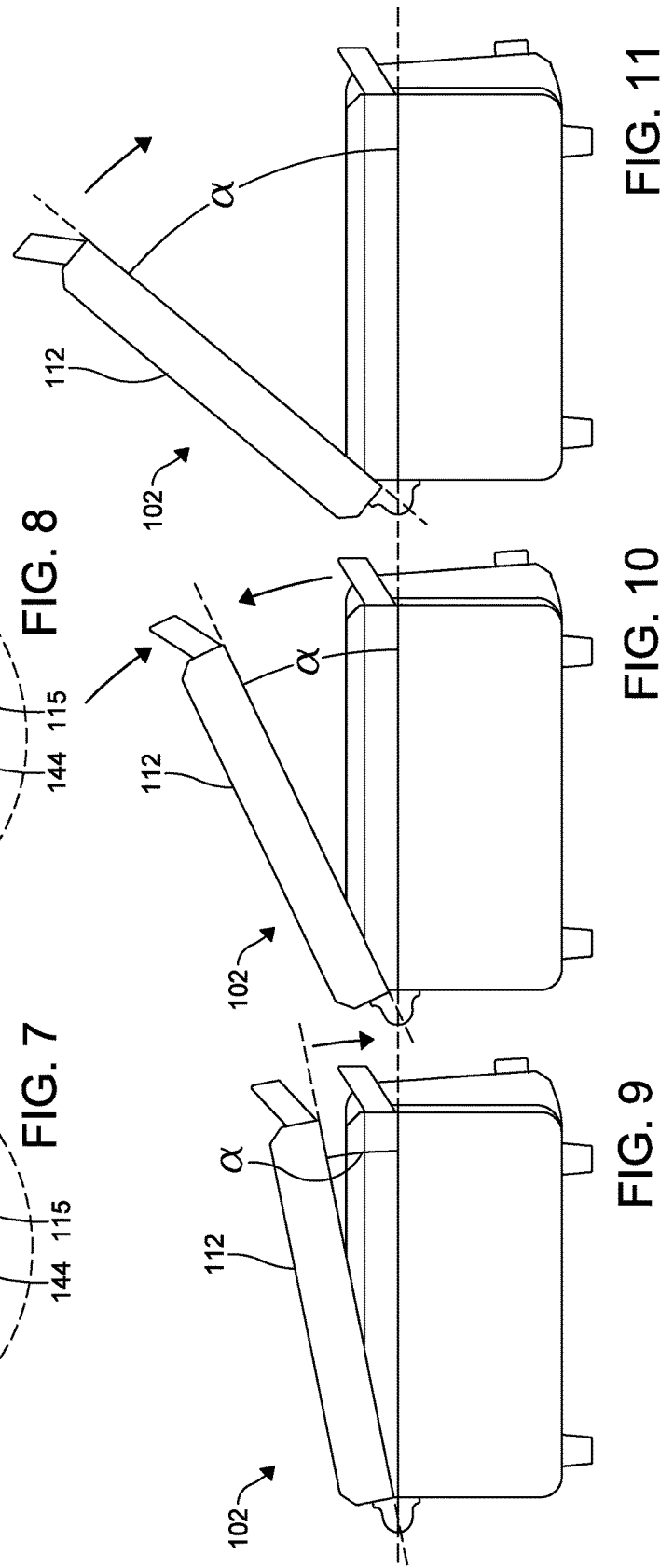

TOASTER OVEN SYSTEM AND METHOD

FIELD

The present disclosure relates to countertop ovens and, more specifically, to toaster ovens for use on countertops of home kitchens.

INTRODUCTION

This section provides background information related to the present disclosure which is not necessarily prior art.

Countertop toaster ovens are well known. Toaster ovens are multi-purpose kitchen appliances that may be used to toast, bake, broil, or reheat foodstuff. Conventional countertop ovens typically include a housing defining a cooking cavity within, with an opening to access the cooking cavity. Traditional toaster ovens are usually made from metal such as steel or from plastics. They contain a housing with a glass door at the front and typically have a plurality of straight heating elements. The cavity can typically accept multiple layers or other accessories for inserting and cooking food including, but not limited to, crisper baskets, toast or pizza racks, baking pans, and grill plates.

Known countertop toaster ovens are manufactured in different sizes to accommodate a variety of different user requirements. One challenge associated with manufacturing and selling, specifically, combinations of different kitchen appliances is ensuring sufficient countertop space or clearance. Such kitchen appliances can be difficult to install and use in a conventional home kitchen, especially when a door opens away from a cooking cavity of the combination kitchen appliance.

There is a continuing need for a toaster oven system that permits for easier installation and use on a countertop of a home kitchen. Desirably, the toaster oven system allows for easier access to a cooking cavity regardless of the kitchen environment in which it is installed.

SUMMARY

In concordance with the instant disclosure, a toaster oven system that permits for easier installation and use on a countertop of a home kitchen, and which allows for easier access to a cooking cavity regardless of the kitchen environment in which it is installed, has been surprisingly discovered.

In one embodiment, a toaster oven system includes a main body, a heating element, a front door, and a top door. The main body has a cooking cavity for holding food. The main body also has a front side and a top side, with the front side defining a front opening of the main body, and the top side defining a top opening of the main body. The heating element is disposed in the cooking cavity. The front door is hingedly attached to the main body and movable between a closed position and an opened position. The front door seals the front opening of the main body when in the closed position and does not seal the front opening of the main body when in the opened position. The top door is hingedly attached to the main body and movable between a closed position and an opened position. The top door seals the top opening of the main body when in the closed position and does not seal the top opening of the main body when in the opened position. The food is insertable or removable through either the front opening or the top opening when an associated one of the front door and the top door is in the opened position.

In another embodiment, the toaster oven system further includes a controller and a microswitch. The controller is in electrical communication with the heating element and a power source. The controller is configured to selectively activate and deactivate the heating element for cooking of the food in the cooking cavity when the front door is in the closed position and the top door is in the closed position. The microswitch may be disposed on the main body adjacent the top opening. The microswitch is configured to determine when the top door is in the opened position. Likewise, the microswitch in electrical communication with the controller, and the controller configured to deactivate the heating element when the microswitch determines the top door is in the opened position.

In a further embodiment, the front door has a front door handle, and the top door has a top door handle. When the front door is in the closed position, and when the top door is in the closed position, the front door handle is disposed adjacent to the top door handle. Each of the front door handle and the top door handle may be substantially U-shaped. Each of the front door and the top door may also have a glass window through which the food in the cooking cavity may be viewed prior to moving the front door and the top door to the opened positions.

In an additional embodiment, the top door has an axle protrusion and the main body has a receiver sleeve. The receiver sleeve is configured to receive the axle protrusion of the top door and to permit for the movement of the top door from the closed position to the opened position. The axle protrusion may have an axle stopper and the receiver sleeve may have a receiver stopper. The axle stopper and the receiver stopper are configured to together militate against movement of the top door in the opened position more than seventy degrees (70°) relative to the top door in the closed position.

In yet another embodiment, the toaster oven system further includes a spring mechanism. The top door may be hingedly attached to the main body with the spring mechanism. The spring mechanism may be configured to automatically move the top door to the closed position when the top door is manually moved and is oriented in the opened position less than thirty degrees (30°) relative to the top door in the closed position. The spring mechanism may also be configured to hold the top door in the opened position and automatically return and hold the top door to an orientation of forty-five degrees (45°) relative to the top door in the closed position when the top door is manually moved in the opened position between thirty degrees (30°) and forty-five degrees (45°) relative to the top door in the closed position. The spring mechanism may further be configured to automatically return the top door to the orientation of forty-five degrees (45°) relative to the top door in the closed position when the top door is manually moved in the opened position between forty-five degrees (45°) and seventy degrees (70°) relative to the top door in the closed position. In a certain example, the spring mechanism includes a pair of angled spring arms disposed within an interior of the top door and connected to a spring coil disposed at a hinge area of the top door. A first cover body and a second cover body may be disposed adjacent and cover the spring coil at the hinge area of the main body. The first cover body is configured to move inside of the second cover body when the top door is moved from the closed position to the opened position.

In yet a further embodiment, the toaster oven system includes a grill plate that removably disposed in the cooking cavity. The grill plate has a plurality of holes configured to facilitate drainage of grease. The cooking cavity may have a bottom wall, a first sidewall, and a second sidewall, with the heating element and the grill plate disposed above the bottom wall. Each of the first sidewall and the second sidewall may have guide rails configured to removably hold the grill plate in an installed position. The grill plate may include stopper features configured to align and selectively engage the grill plate with the guide rails. The stopper features may also permit for the grill plate to selectively disengage with the guide rails upon a manual tilting forward of the grill plate in the cooking cavity. The plurality of holes in the grill plate are not disposed directly above the heating element when the grill plate is in the cooking cavity in the installed position, to thereby minimize the opportunity for an undesired amount of smoke to be generated within the cooking cavity while the food is being cooked.

In yet an additional embodiment, a method for cooking foods includes the steps of providing the toaster oven system and the food to be cooked. At least one of the front door and the top door is manually moved to the opened position. The food is then inserted through at least one of the front opening and the top opening of the main body of the toaster oven system. Each of the front door and the top door are then moved to the closed position. A temperature is then raised within the cooking cavity, using the heating element, to a predetermined cooking temperature to cook the food. Upon completion of the cooking of the food, each of the front door and the top door are then opened to remove the food from the cooking cavity.

In a particular embodiment, a toaster oven system contains both a front glass door, allowing access into a cooking cavity, and an additional handle that allows the top cavity to be lifted open at an angle of up to seventy degrees (70°). This unique arrangements offers substantial benefits including i) easier access into the cavity, to allow toppings or other condiments to be easily inserted on the food, ii) added convenience and access to fill with accessories such as crisper basket without having to slide accessories out from the front of the cavity and place them on the countertop like known toaster ovens, iii) the ability to easily turn or flip food, e.g., steaks, without having to remove the grill plate from the oven cavity and place it on the countertop, and iv) a micro switch built in for a safety feature, which allows the unit to detect when the lid is open and shut off the top heating elements. The toaster oven system may also include a fan for convection, air fry, and the like.

In an exemplary embodiment, a combination toaster oven air fryer includes (1) a front glass door to access the cavity from the front, and (2) a top lid portion configured to lift open at an angle of up to seventy degrees (70°) to provide access to the cavity from the top of the toaster oven. The top lid portion can include a handle to aid the user in opening the top lid portion. The toaster oven also includes rollers on the left edge configured to receive a male protruding part located on the top lid portion to secure the top lid portion in the closed position. The toaster oven can further include two heating elements extending along the inner bottom portion and two heating elements extending along the inner portion of the top lid. When the top lid portion is in an open position, the user can add and remove food without having to slide the food through the front opening, add or insert toppings to the food, and allows easier maneuverability of the food being cooked, e.g., turn/flip food.

DRAWINGS

The above, as well as other advantages of the present disclosure, will become readily apparent to those skilled in the art from the following detailed description, particularly when considered in the light of the drawings described herein.

Figure 3:
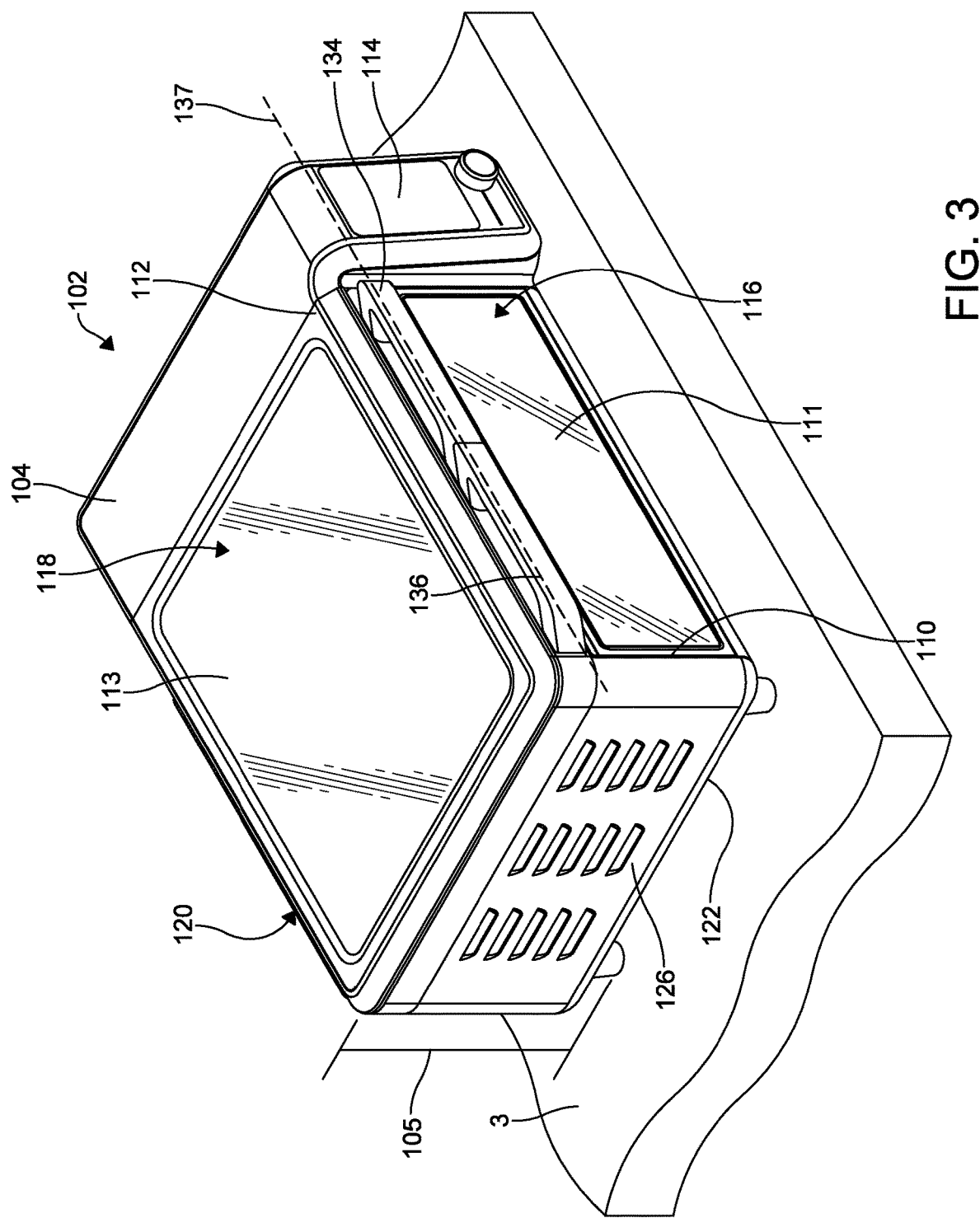
Figure 4:
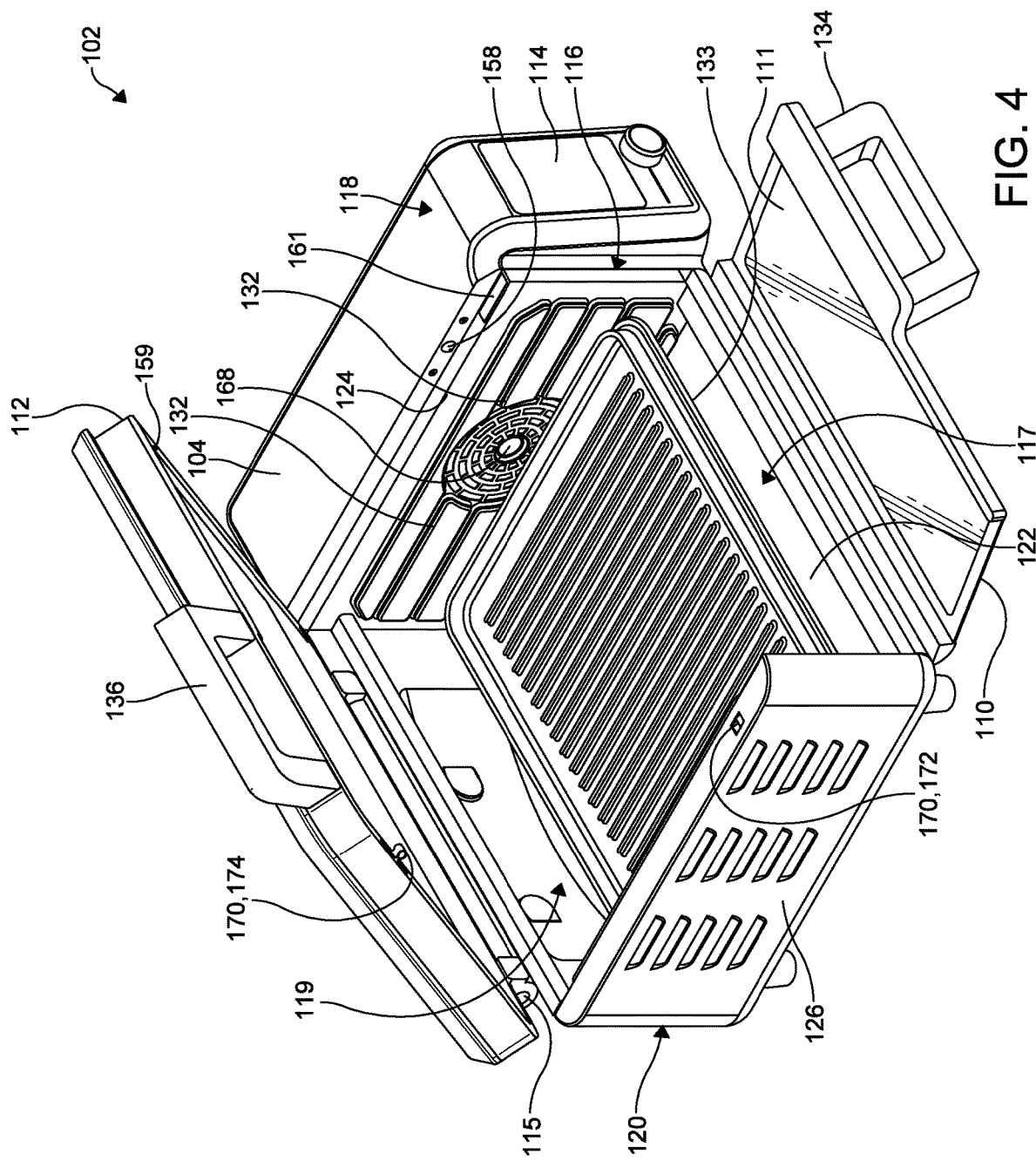
Figure 5:
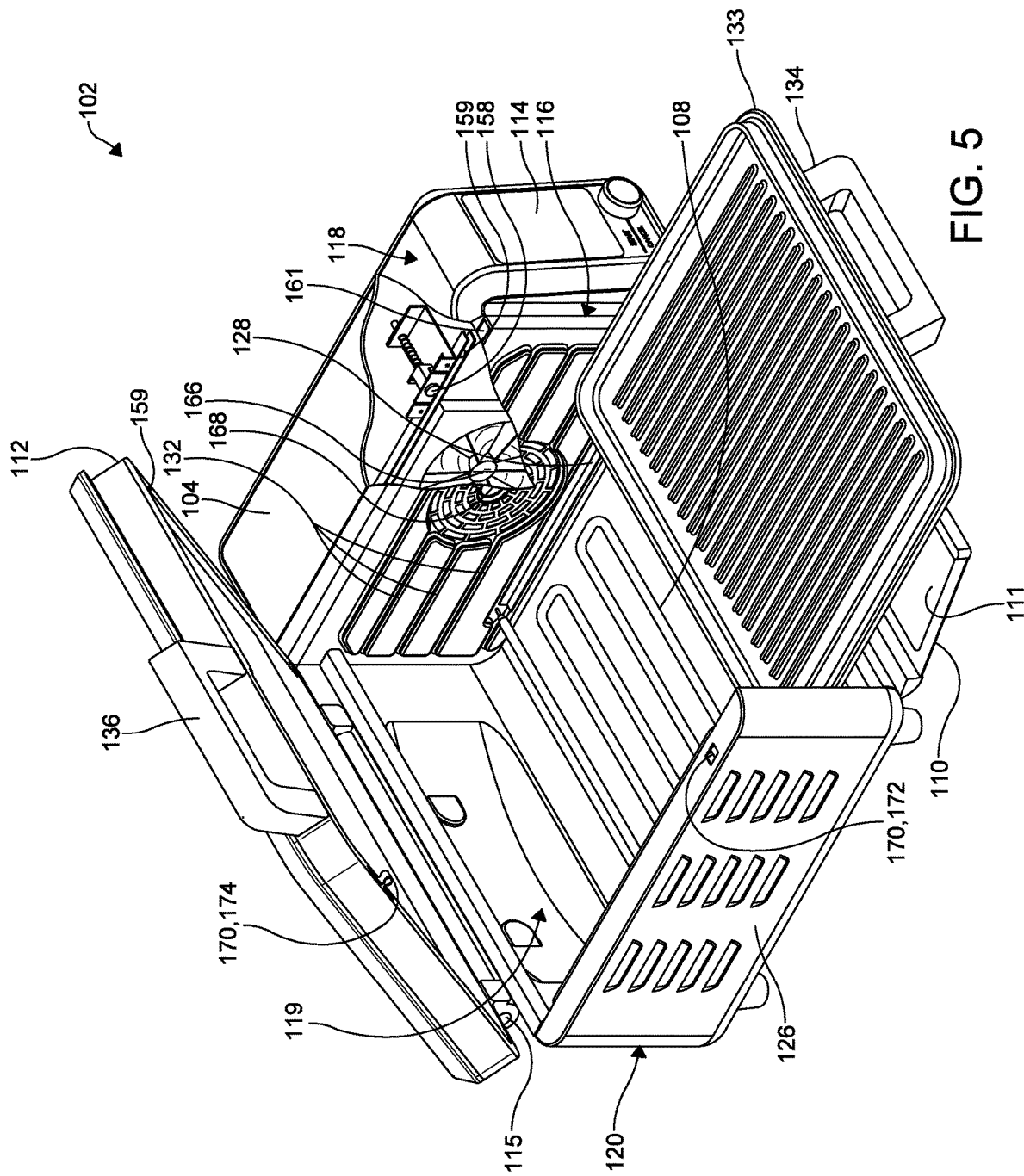
Figure 13:
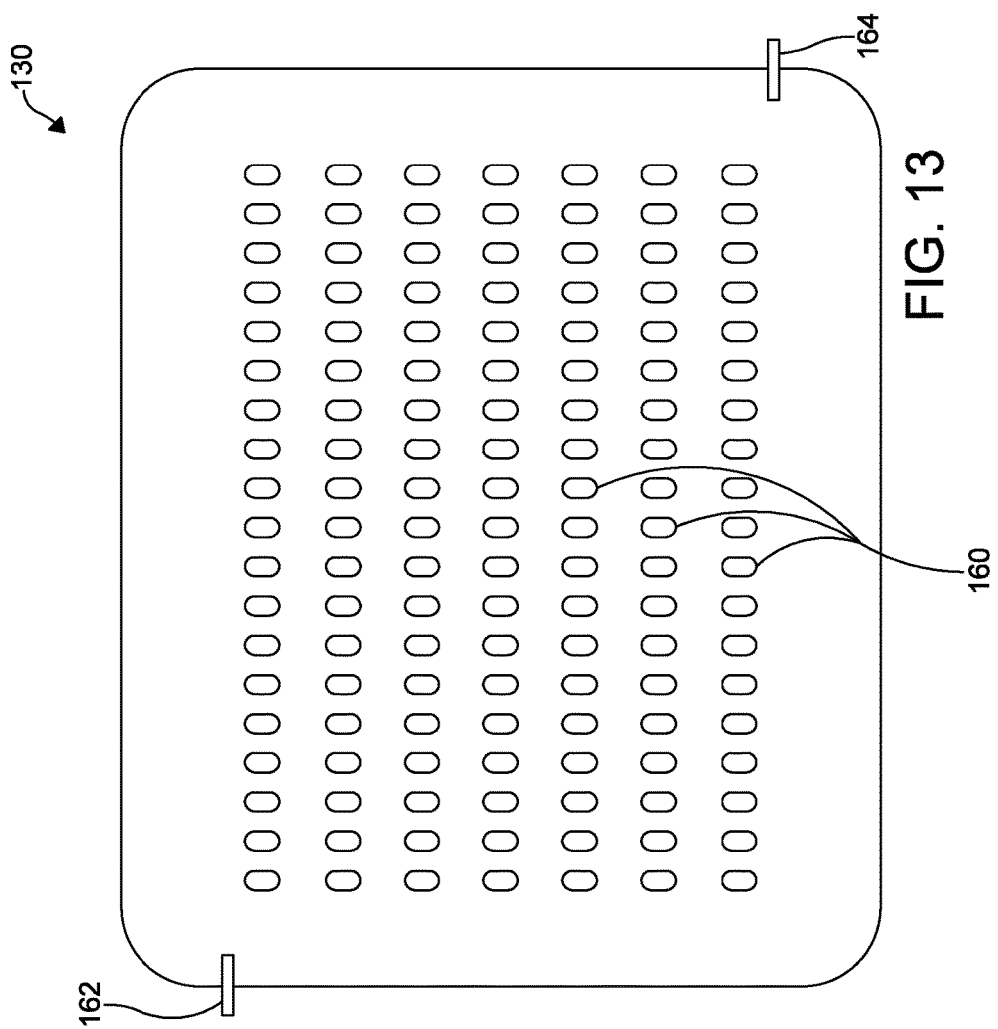
Figure 12:
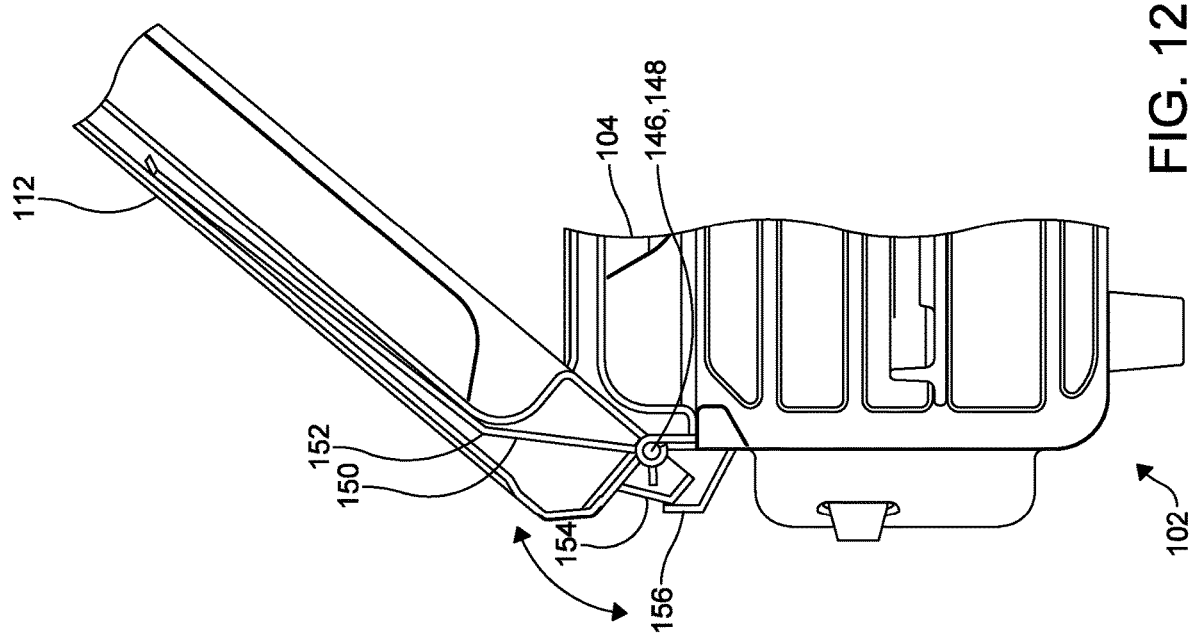
Figure 14:
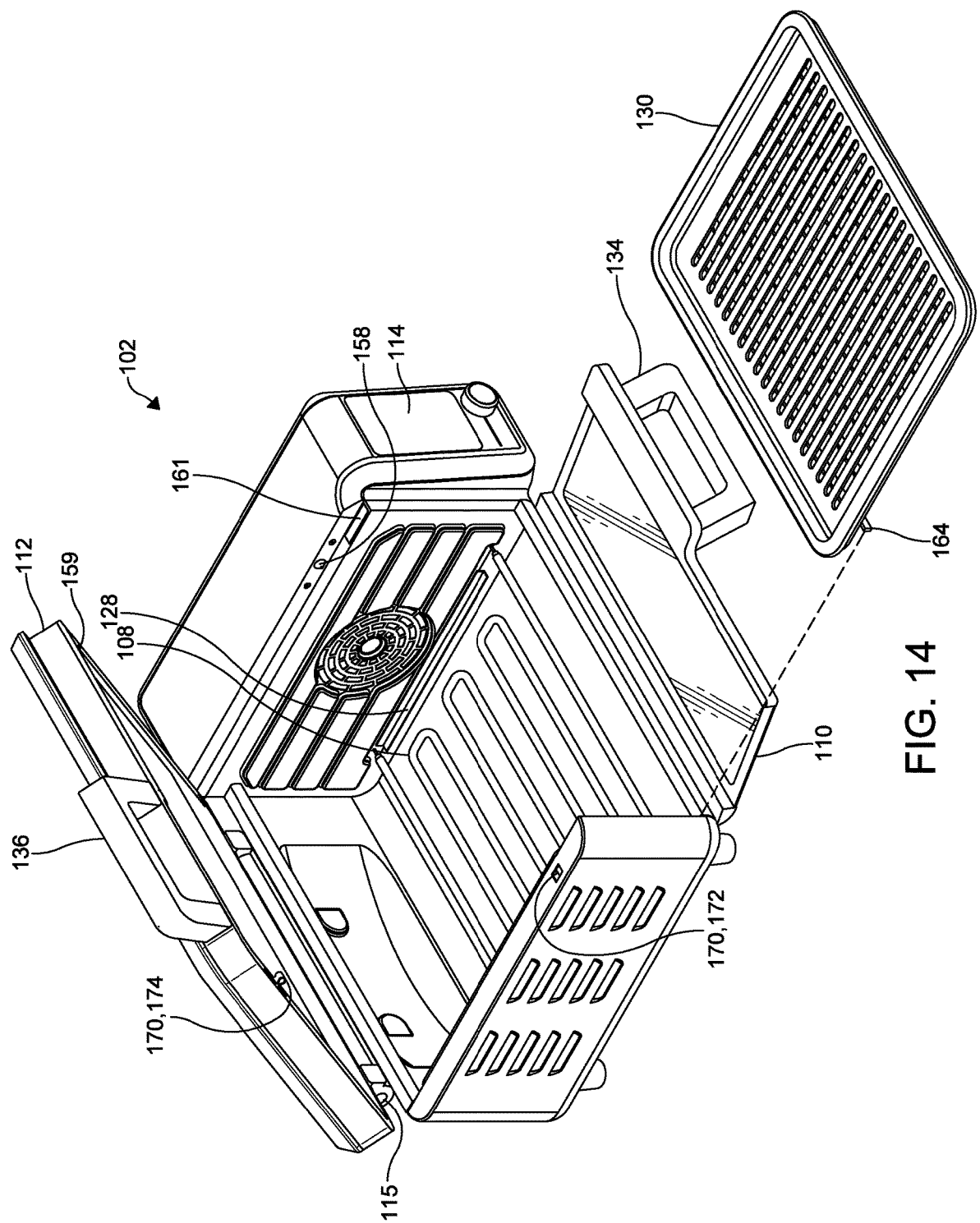
Figure 15:
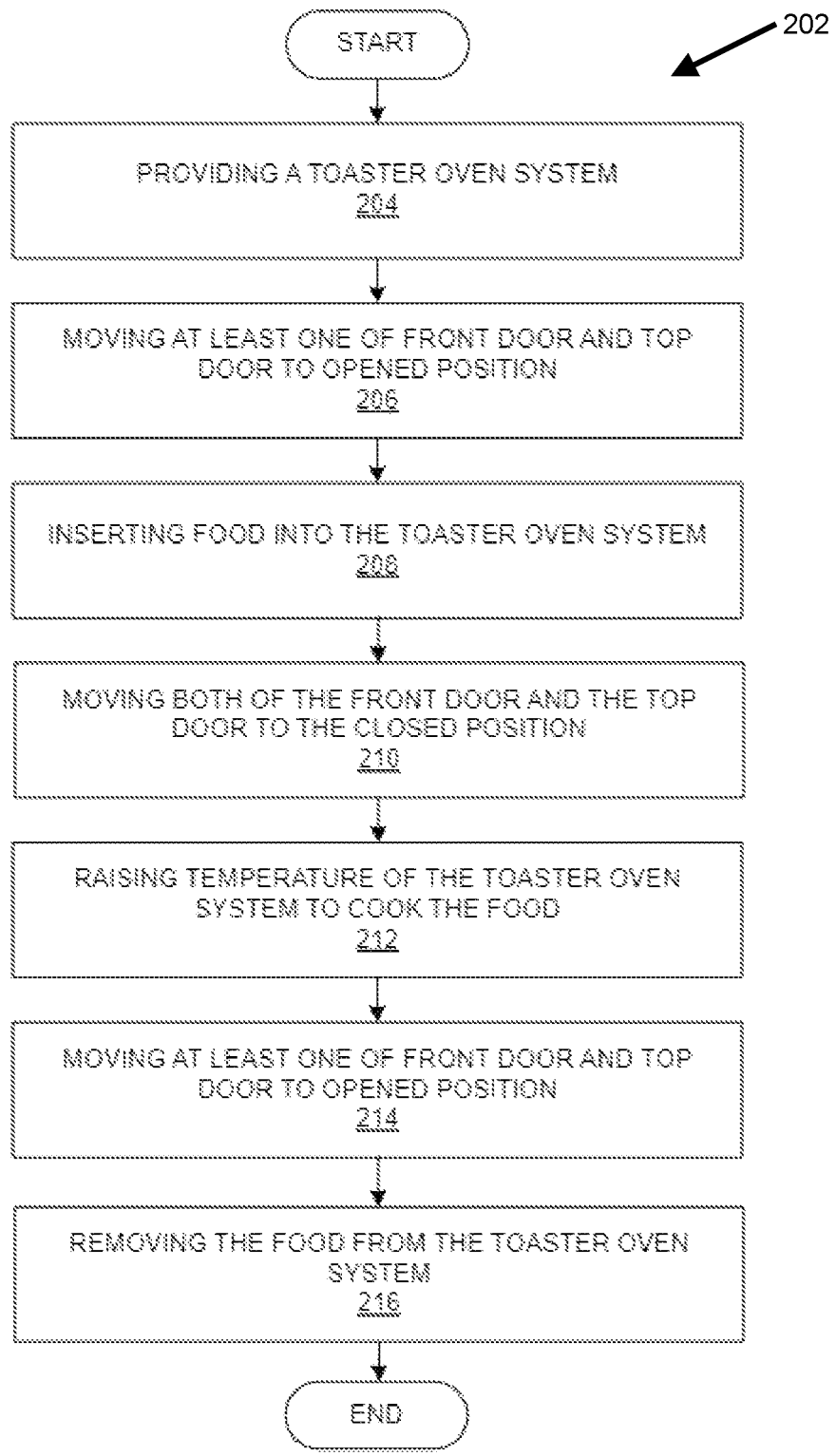

FIG. 3 is a top front perspective view of a toaster oven system according to one embodiment of the present disclosure, the toaster oven system having both a front door configured to open outwardly from a front side of a main body of the toaster oven system, and a top door configured to open upwardly from a top side of the main body, with both the front door and the top door shown in a closed position;

FIG. 4 is a top front perspective view of the toaster oven system shown in FIG. 3, with both the front door and the top door shown in an open position, and further showing an interior cooking accessory permitting for two-layer cooking;

FIG. 5 is a top front perspective view of the toaster oven system shown in FIG. 4, with the interior cooking accessory removed to show an underlying heating element, and with a portion of the main body removed to show an underlying fan assembly for circulation of air in the cooking cavity, and also showing a microswitch assembly configured to determine when the top door is in the open position and to deactivate the heating elements for reasons of safety when the top door is in the open position, the microswitch contacted by the top door in the closed position and not contacted by the top door in the opened position, and further illustrating a magnet positioned to militate against formation of a door warping gap with a multitude of open-close cycles, and further showing a guide rail configured to slidably receive a grill plate when installed in the cooking cavity;

FIG. 6 is a top rear perspective view of the toaster oven system shown in FIG. 3, and illustrating an uncovered hinge area with a hinge connecting a top door to the main body;

FIG. 7 is a fragmentary, enlarged, top perspective view of the hinge area taken at callout A in FIG. 6, and showing the top door in a closed position, and further showing an axle protrusion of the top door disposed in a sleeve receiver of the main body to hingedly attached the top door to the main body, and there being a gap between stopper features of the axle protrusion and the sleeve receiver due to the top door being in the closed position;

FIG. 8 is a fragmentary, enlarged, top perspective view of the hinge area taken at callout A in FIG. 6, and showing the top door in an opened position and there being no gap between the stopper features of the axle protrusion and the sleeve receiver, the stopper features militating against a movement of the top door in the opened position beyond a predetermined maximum angle of orientation relative to the top door in the closed position;

FIG. 9 is a side elevational view of the toaster oven system shown in FIG. 3, with the top door in an opened position and oriented at an angle of between 0 and 30 degrees relative to the top door in a closed position, with an arrow illustrating that the top door is biased to return to the closed or almost closed position due to a weight of the top door;

FIG. 10 is a side elevational view of the toaster oven system shown in FIG. 3, with the top door in an opened position and orientated at an angle of between 30 and 45 degrees, and with arrows illustrating the top door is biased to be held in the opened position at an angle of about 45 degrees relative to the top door in the closed position;

FIG. 11 is a side elevational view of the toaster oven system shown in FIG. 3, with the top door in an opened position and oriented at an angle of between 45 and 70 degrees, with the maximum possible angle being 70 degrees, and with arrows showing the top door is biased to returned to the opened position at an angle of about 45 degrees relative to the top door in the closed position;

FIG. 12 is a fragmentary, enlarged, cross-sectional side elevational view of the rear side of the main body and the top door taken at section line B-B in FIG. 6, and further illustrating a positioning of at least one spring arm within the top door to create a force bearing point or area inside of the top door for biasing the top door when not being manually moved, and also showing a first cover and a second cover over the spring mechanism, and further showing the top door in an opened position with the first cover disposed at least partly inside of the second cover when the top door is in the opened position;

FIG. 13 is a bottom plan view of a grill plate according to one embodiment of the disclosure, the grill plate adapted for use within the cooking cavity of the main body of the toaster oven system, and further illustrating a plurality of holes disposed in rows and columns through the grill plate, and also showing stopper features at opposite corners of the grill plate configured to align and lock the grill plate on ends of the guide rails in the cooking cavity, and permitting for a disengagement by a tilting forward of the grill plate to disengage the stopper feature from the guide rails so that the grill plate may be slid out of the cooking cavity along the guide rails;

FIG. 14 is a top front perspective view of the toaster oven system shown in FIG. 3, an further shown with the grill plate of FIG. 13 being installed into the cooking cavity, and showing female rollers adjacent an edge of the body configured to receive a male protruding part that inserts into between the female rollers to selectively lock the top door in a closed position, and further showing the male protruding part that inserts between the female rollers to selectively lock the top door in a closed position, the male protruding part and the female rollers together configured to hold down the top door shut when in the closed position and militate against spring back and an accidental opening of the top door without pressure from a user manually lifting the top door from the closed position to the opened position; and FIG. 15 is a flow diagram illustrating a method of using the toaster oven system according to one embodiment of the disclosure.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical unless otherwise disclosed.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
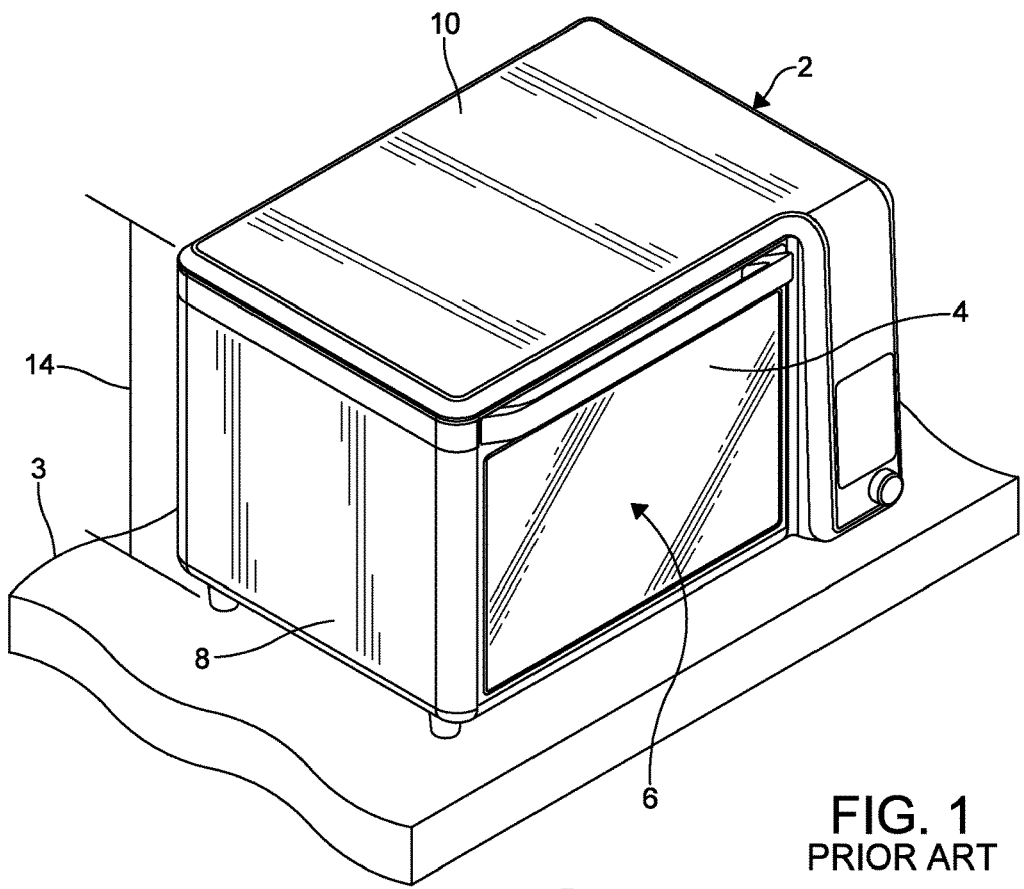
FIG. 1 is a top front perspective view of a conventional toaster oven of the prior art shown on a countertop of a kitchen, and the conventional toaster oven having a single front door that is configured to open outwardly from a front side of a toaster oven body to give access to a cooking cavity.
Figure 2:
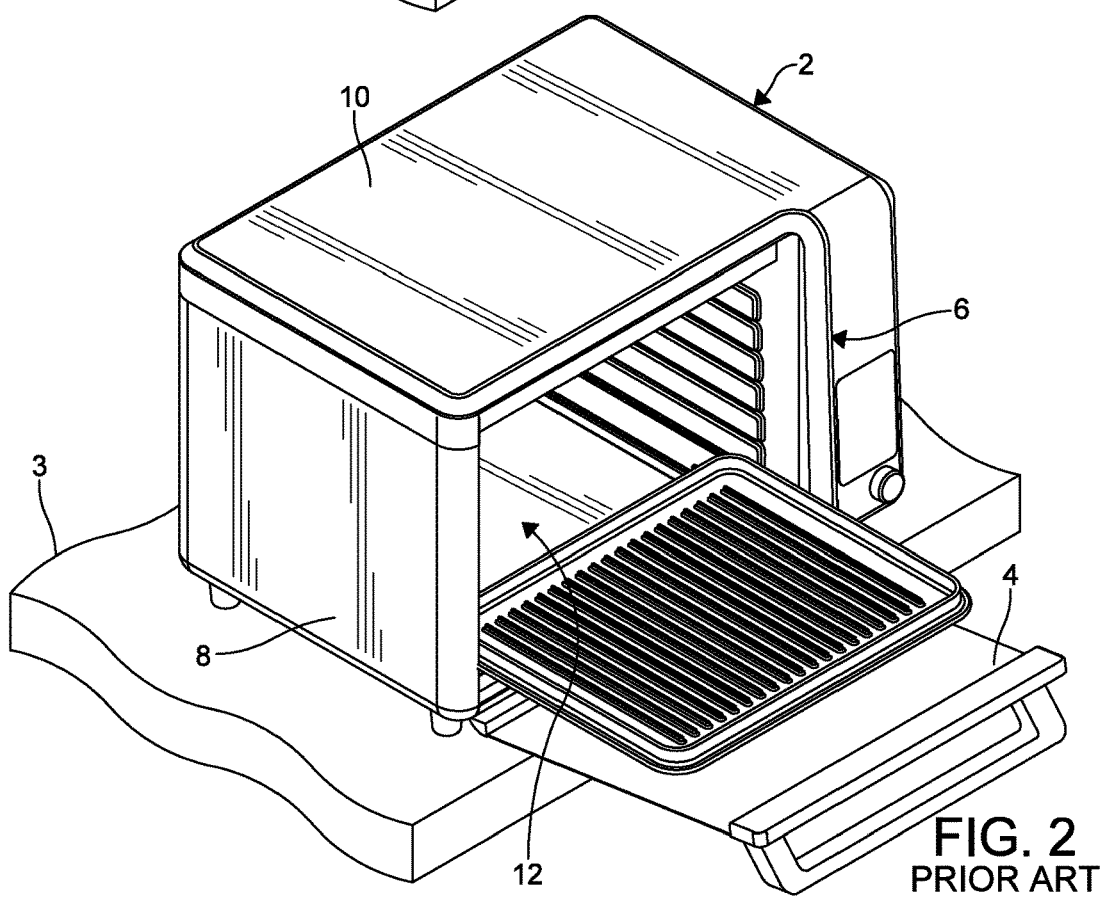
FIG. 2 is a top front perspective view of the conventional toaster oven of the prior art shown in FIG. 1, with the single front door opened, and illustrating a cooking accessory such as a crisper basket being removed from the cooking cavity through the front side of the conventional toaster oven.

The present technology improves upon a known or conventional toaster oven 2, for example, as shown in FIGS. 1-2, adapted for use on a countertop 3 of most modern home kitchens. The conventional toaster oven 2 only has a single door 4, typically disposed on a front portion 6 of a primary body 8 of the conventional toaster oven 2. The conventional toaster oven 2 also has a solid top portion 10 and only permits for insertion and removal of food through a front opening 12 in the front portion of the primary body 8. The conventional toaster oven 2 also has a height 14 that permits it to be located with typical volumes of space available on the countertop 3 in the kitchen.

The present technology, as shown in FIGS. 3-15, includes a toaster oven system 102 that is adapted for use on the countertop 3 of most modern home kitchens, but which represents certain improvements relative to the conventional toaster oven shown in FIGS. 1-2.

Referring to FIGS. 3-5, the toaster oven system 102 may include a main body 104 with a height 105. The main body 104 defines a cooking cavity 106. The toaster oven system 102 further includes a heating element 108 that is disposed in the cooking cavity 106, a front door 110, a top door 112, and a controller 114. It should be appreciated that the height 105 of the toaster oven system 102 of the present disclosure when in the closed position is less than the height 14 of the conventional toaster oven 2 due to the employment of the top door 112, as described further herein.

The main body 104 may further have a front side 116 with a front opening 117, a top side 118 with a top opening 119, and a rear side 120. The front door 110 is disposed at the front side 116 of the main body 104 and selectively seals the front opening 117 when the front door 110 is in the closed position. Each of the front door 110 and the top door 112 may further have a glass window 111, 113, which may be used to view the cooking cavity 106 during operation of the toaster oven system 102.

It should be appreciated that the cooking cavity 106 of the main body 104 may also be defined by a bottom wall 122, a first sidewall 124, and a second sidewall 126 of the main body 104, as shown in FIGS. 4-5. The second sidewall 126 may include guide rails 128 (shown in FIG. 5) configured to removably hold a grill plate 130 (shown in FIG. 13-14) in an installed position within the cooking cavity 106. In particular, there may be a guide rail 128 disposed on each of the first sidewall 124 and the second sidewall 126 and configured to support the grill plate 130 above the heating element 108 in operation. As a non-limiting example, the guide rail 128 may be a bracket affixed with a mechanical fastener such as a screw, bolt, rivet or the like to the interior surfaces of the first sidewall 124 or the second sidewall 126.

The first and second sidewalls 124, 126 may further have channels 132 formed therein. The channels 132 are configured to receive other cooking accessories 133 such as pans, grates, and the like, on which the food may be placed in operation. The heating element 108 is disposed above the bottom wall 122, and beneath the other cooking accessories 133 when installed, and in between each of the first sidewall 124 and the second sidewall 126. Other suitable structures for holding the cooking accessories 133 within the cooking cavity 106 may also be employed, as desired.

With reference to FIGS. 4-12, the front door 110 is hingedly attached to the main body 104 and movable between a closed position (shown in FIG. 3) and an opened position (shown in FIG. 4). The top door 112 is also hingedly attached to the main body 104 with at least one hinge 115, as illustrated in FIGS. 4-12. The top door 112 is movable between a closed position (shown in FIG. 3) and an opened position (shown in FIG. 4). Although both the front door 110 and the top door 112 are shown as being in the closed position or the opened position simultaneously, for purposes of illustration, it should also be appreciated that the front door 110 and the top door 112 may be independent moveable relative to each other, with one being in the closed position and the other being in the opened position, at the discretion of the user of the toaster oven system 102.

When the front door 110 is in the opened position, the front opening 117 is unsealed to permit for the insertion or removal of food therethrough. The top door 112 is disposed at the top side 118 of the main body 104 and selectively seals the top opening 119 when the top door 112 is in the closed position. When the top door 112 is in the opened position, the top opening 119 is unsealed to permit for the insertion or removal of food therethrough.

In particular, the food may be insertable or removable through either the front opening 117 or the top opening 119 when an associated one of the front door 110 and the top door 112 may be in the opened position. It should be appreciated that when both the front door 110 and the top door 112 are in the opened positions, an optimum access to the food within the cooking cavity 106 may be facilitated.

With renewed reference to FIGS. 3-5, it should be understood that the front door 110 may include a front door handle 134. The top door 112 may also include a top door handle 136. When both the front door 110 and the top door 112 are in the closed positions, the front door handle 134 may be disposed adjacent to the top door handle 136 and arranged on a same axis 137, as shown in FIG. 3. It should be appreciated that this arrangement may provide for a superior usage of the countertop space associated with the toaster oven system 102, as there is no handle disposed on top of the top door 112 in such case. Each of the front door handle 134 and the top door handle 136 may also be substantially U-shaped, as shown in FIGS. 3-5. One of ordinary skill in the art may also select other suitable locations and shapes for each of the front door handle 134 and the top door handle 136 within the scope of the present disclosure.

Referring again to FIGS. 4-12, it should be appreciated that, in certain examples, the hinge 115 for the top door 112 may include an axle protrusion 138, and the main body 104 may include a receiver sleeve 140. The receiver sleeve 140 is configured to receive the axle protrusion 138 of the top door 112 and to permit for the movement of the top door 112 from the closed position to the opened position. As shown in FIGS. 7-8, the axle protrusion 138 may include axle stopper 142 and the receiver sleeve 140 may also include a receiver stopper 144. The axle stopper 142 and the receiver stopper 144 are configured to together militate against movement of the top door 112 in the opened position more than a predetermined angle α, such as seventy degrees (70°), for example, relative to the top door 112 in the closed position.

In particular, where the axle stopper 142 and the receiver stopper 144 are spaced apart to form a gap 143, as shown in FIG. 7, then free movement of the top door 112 is permitted. However, where the axle stopper 142 and the receiver stopper 144 are abutting, as shown in FIG. 8, then no free movement upward and beyond the predetermined angle α is permitted. Other suitable means for creating a hard stop to the movement of the top door 112 beyond the predetermined angle α may also be selected, as desired.

As shown in FIGS. 9-12, the hinge 115 may further include a spring mechanism 146, with which the top door 112 is hingedly attached to the main body 104. Additional mechanical hinges 115 for hingedly attaching the top door 112 to the main body 104, for example, a barrel hinge or a butt hinge, may also be employed together with the spring mechanism 146. The spring mechanism 146 may be configured to automatically bias and move the top door 112 in operation. For example, as shown in FIG. 9, the spring mechanism 146 may be configured to automatically move the top door 112 to the closed position when the top door 112 is manually moved and is oriented in the opened position less than thirty degrees (30°) relative to the top door 112 in the closed position.

In a further example, shown in FIG. 10, the spring mechanism 146 may also be configured to hold the top door 112 in the opened position and automatically return and hold the top door 112 to an orientation of forty-five degrees (45°) relative to the top door in the closed position when the top door 112 is manually moved in the opened position between thirty degrees (30°) and forty-five degrees (45°) relative to the top door 112 in the closed position.

As also shown in FIGS. 10 and 11, for example, the spring mechanism 146 may further configured to automatically return the top door 112 to the orientation of forty-five degrees (45°) relative to the top door 112 in the closed position when the top door 112 is manually moved in the opened position between forty-five degrees (45°) and seventy degrees (70°) relative to the top door 112 in the closed position (shown in FIG. 10), and even when the top door 112 is moved to the maximum predetermined angle α of seventy degrees)(70° (shown in FIG. 11).

It should also be appreciated that all angles set forth herein can have a tolerance of, for example, about +/−10 degrees. Other suitable angles, and also mechanical characteristics of the spring mechanism 146 for automatically biasing and moving the top door 112, may also be selected by one skilled in the art within the scope of the present disclosure.

In a particular example, shown in FIG. 12, the spring mechanism 146 may include a spring coil 148 and at least one angled spring arm 150. In a most particular example, the at least one angled spring arm 150 can include two or more angled spring arms 150 that may be spaced apart from one another and contact the top door 112 at multiple contact points or areas. The angled spring arms 150 may be disposed within an interior of the top door 112, for example, and may be connected to the spring coil 148 that is disposed at a hinge area of the top door 112. The angled spring arms 150 may each have a bent portion 152, as shown in FIG. 12, that is disposed inside of the top door 112 as well. The bent portion 152 has an angle configured to provide a predetermined amount of biasing force to the top door 112, in order to automatically bias and move the top door 112 to one of the predetermined angles α in operation, for example, as described hereinabove. In particular, the bent portion 152 creates a force bearing point for the top door 112 configured to provide the desired biasing force.

As further shown in FIGS. 6 and 12, the spring coil 148 of the hinge 115 may also be covered or protected by a first cover body 154 and a second cover body 156 disposed on the rear side 120 of the main body 104. The first cover body 154 and the second cover body 156 may be disposed adjacent and over the spring coil 148 in the hinge area, for example. In operation, the first cover body 154 is configured to move at least partly inside of the second cover body 156 when the top door 112 is moved from the closed position to the opened position. Other suitable means for covering and protection the spring coil 148 of the hinge 115 may also be employed, as desired.

With renewed reference to FIGS. 3-5, the controller 114 is in electrical communication with the at least one heating element 108 and a power source (not shown). The controller 114 may include suitable electronics and a user interface that permits for the selection and control of a temperature and a cooking time for the cooking cavity 106, in operation. As a non-limiting example, the suitable electronics may include a microprocessor and a tangible non-transitory computer-readable memory on which instructions are encoded for the operation of the toaster oven system 102. As another example, the user interface may include dials, buttons, a touchscreen, or the like. One of ordinary skill in the art may select the suitable electronics and the user interface within the scope of the present disclosure.

In certain examples, the controller 114 may be configured to selectively activate and deactivate the heating element 108 for cooking of the food in the cooking cavity 106 when the front door 110 may be in the closed position and the top door 112 may be in the closed position. For example, the toaster oven system 102 may also include a microswitch 158 disposed on the main body 104 adjacent the top opening 119. The microswitch 158 may be configured to determine when the top door 112 is in the opened or closed positions. The microswitch 158 is also in electrical communication with the controller 114, which may likewise us feedback from the microswitch 158 to deactivate the heating element when the microswitch 158 determines the top door 112 is in the opened position.

It should be appreciated the toaster oven system 102 may have a magnet 159 disposed adjacent to the microswitch 158 that is configured to ensure proper alignment for the microswitch 158 with the top door 112 when in the closed position. The magnet 159 position may also minimize any warping and formation of an undesirable gap between the top door 112 and the portion of the main body 104 within which the microswitch 158 is disposed following multiple open-close cycles. As shown in FIGS. 3-5, the magnet 159 may be disposed on the top door 112 and adapted to be magnetically attracted to a ferrous or magnetic body or plate 161 disposed on the main body 104. It should also be appreciated that the magnet 159 may alternatively be disposed on the main body 104 and the ferrous or magnetic body or plate 161 may be disposed on the top door 112. One of the magnet 159 and the ferrous or magnetic body or plate 161 may also be disposed on a ledge of the main body 104 (as shown in FIGS. 4-5), with the ledge configured to receive at least a portion of the top door 112 when in the closed position. Other suitable means for facilitating an alignment and consistent operation of the microswitch 158 in the toaster oven system 102 may also be employed, as desired.

Referring now to FIGS. 13-14, the grill plate 130 for use with the toaster oven system 102 of the present disclosure may have a plurality of holes 160 configured to facilitate drainage of grease during operation. The holes 160 may be arranged in rows and columns and may further be arranged so that they are not disposed directly above the heating element 108 when installed, so as to avoid undesirable generation of smoke from grease dripping onto the heating element 108 through the holes 160 in operation. The heating element 108 may involve a plurality of straight elements, or a single serpentine element, disposed across the bottom of the cooking cavity 106, as desired. A skilled artisan may also select other suitable numbers and shapes of heating elements within the scope of the present disclosure.

With reference to FIG. 13, the grill plate 130 may also include stopper features 162, 164 configured to align with and selectively engage the grill plate 130 with ends of the guide rails 128 upon installation. The stopper features 162, 164 may be small plates attached at opposite corners of the grill plate 130 on an underside of the grill plate 130, for example, and configured to slide adjacent the ends of the guide rails 128 to selective lock into place the grill plate 130 upon installation. Advantageously, the stopper features 162, 164 in this arrangement permit for the grill plate 130 to selectively disengage with the guide rails 128 upon a manual tilting forward of the grill plate 130 in the cooking cavity 106 of the main body 104, which raises the one of the stopper features 162, 164 adjacent a rear of the cooking cavity 106 so that the grill plate 130 may be slid outwardly along the guide rails 128, for example, as shown in FIG. 14.

In certain examples, as shown in FIG. 5, it should be appreciated that the toaster oven system 102 of the present disclosure may be provided with a fan assembly 166 that effectively creates a combination toaster oven and air fryer assembly. The fan assembly 166 may be disposed in the main body 104 on a side of the of first sidewall 124 opposite from the cooking cavity 106. The fan assembly 166 may be configured to provide a flow of air through a fan opening 168 formed through the first sidewall 124, for example. The fan assembly 166 may further be in electrical communication with the controller 114, which likewise may be configured to control a speed and a duration of use for the fan assembly 166 in operation. One of ordinary skill in the art may also select other suitable configurations and types of the fan assembly 166 within the scope of the present disclosure.

With reference to FIGS. 4-5 and 14, it should also be appreciated that the toaster over system 102 may further include a locking mechanism 170 for selectively holding the top door 112 in the closed position. The locking mechanism 170 may be disposed both the top door 112 and at least one of the first sidewall 124 and the second sidewall 126. In certain examples, the locking mechanism 170 is disposed on an underside of the top door 112 and a topside of one of the first sidewall 124 and the second sidewall 126. In another example, the one of the first sidewall 124 and the second sidewall 126 may have a side recess (not shown) that is open to the topside and in which is housed at least part of the locking mechanism 170 for selectively holding the top door 112 in the closed position.

As a non-limiting example, shown in FIGS. 4-5 and 14, the locking mechanism 170 can include female rollers 172 disposed adjacent an edge of the main body 104 and configured to receive a corresponding male protruding part 174 disposed on an underside of the top door 112. The female rollers 172 may be spring-loaded, and configured to move apart upon receipt of the corresponding male protruding part 174, but to be biased toward the mail protruding part 174 when inserted to securely but removably hold the male protruding part 174 in place. In this manner, the corresponding male protruding part 174 is configured to be inserted between the female rollers 172 to selectively lock the top door 112 in the closed position. In particular, the male protruding part 174 and the female rollers 172 may together be configured to hold down the top door 112 in the closed position and militate against spring back and an accidental opening of the top door 112 without pressure being applied by the user manually lifting the top door 112 from the closed position to the opened position.

Although the female rollers 172 and the corresponding male protruding part 174 are shown and described as a particular type of the locking mechanism 170, it should be understood that other suitable types of the locking mechanism 170 are also contemplated and considered to be within the scope of the instant disclosure.

FIG. 15 is a flowchart that shows a method 202, according to some embodiments of the present disclosure. At step 204, the method 202 may include providing a toaster oven system 102 as described hereinabove. At step 206, the method 202 may include moving at least one of the front door 110 and the top door 112 to the opened position. At step 208, the method 202 may include inserting the food through at least one of the front opening 117 and the top opening 119. At step 210, the method 202 may include moving each of the front door 110 and the top door 112 to the closed position. At step 212, the method 202 may include raising a temperature within the cooking cavity 106, using the heating element 108, to a predetermined cooking temperature to cook the food. At step 214, the method 202 may include opening each of the front door 110 and the top door 112, to thereafter at step 216 removing the food from the cooking cavity 106.

Advantageously, the toaster oven system 102 and the method 202 of the present disclosure has been found to permit for easier installation and use on the countertop 3 of the modern home kitchen. The toaster oven system 102 and the method 202 also allows for easier access to the cooking cavity 106 regardless of the kitchen environment in which the toaster oven system 102 is installed and may further optionally be provided as a combination toaster oven and air fryer due when the fan assembly is provided in the main body 104 as well.

While certain representative embodiments and details have been shown for purposes of illustrating the invention, it will be apparent to those skilled in the art that various changes may be made without departing from the scope of the disclosure, which is further described in the following appended claims.

What is claimed is:

1. A toaster oven system, comprising:
a main body having a cooking cavity for holding food, the main body having a front side and a top side, the front side defining a front opening of the main body, and the top side defining a top opening of the main body;
a heating element disposed in the cooking cavity;
a front door hingedly attached to the main body and movable between a closed position and an opened position, the front door sealing the front opening of the main body when in the closed position, and the front door not sealing the front opening of the main body when in the opened position; and
a top door hingedly attached to the main body and movable between a closed position and an opened position, the top door sealing the top opening of the main body when in the closed position, and the top door not sealing the top opening of the main body when in the opened position,
wherein the food is insertable or removable through either the front opening or the top opening when an associated one of the front door and the top door is in the opened position,
wherein the top door has an axle protrusion and the main body has a receiver sleeve, the receiver sleeve configured to receive the axle protrusion of the top door and to permit for movement of the top door from the closed position to the opened position, and the axle protrusion has an axle stopper and the receiver sleeve has a receiver stopper, the axle stopper and the receiver stopper configured to together militate against movement of the top door in the opened position more than seventy degrees (70°) relative to the top door in the closed position.

2. The toaster oven system of claim 1, further comprising a controller in electrical communication with the heating element and a power source, the controller configured to selectively activate and deactivate the heating element for cooking of the food in the cooking cavity when the front door is in the closed position and the top door is in the closed position.

3. The toaster oven system of claim 2, further comprising a microswitch disposed on the main body adjacent the top opening and configured to determine when the top door is in the opened position, the microswitch in electrical communication with the controller, and the controller configured to deactivate the heating element when the microswitch determines the top door is in the opened position.

4. The toaster oven system of claim 1, wherein the front door has a front door handle, and the top door has a top door handle.

5. The toaster oven system of claim 4, wherein the front door handle when the front door is in the closed position is disposed adjacent to the top door handle when the top door is in the closed position.

6. The toaster oven system of claim 5, wherein each of the front door handle and the top door handle is substantially U-shaped.

7. The toaster oven system of claim 1, wherein the top door is hingedly attached to the main body with a spring mechanism.

8. The toaster oven system of claim 7, wherein the spring mechanism is configured to automatically move the top door to the closed position when the top door is manually moved and is oriented in the opened position less than thirty degrees (30°) relative to the top door in the closed position.

9. The toaster oven system of claim 8, wherein the spring mechanism is configured to hold the top door in the opened position and automatically return and hold the top door to an orientation of forty-five degrees (45°) relative to the top door in the closed position when the top door is manually moved in the opened position between thirty degrees (30°) and forty-five degrees (45°) relative to the top door in the closed position.

10. The toaster oven system of claim 9, wherein the spring mechanism is configured to automatically return the top door to the orientation of forty-five degrees (45°) relative to the top door in the closed position when the top door is manually moved in the opened position between forty-five degrees (45°) and seventy degrees (70°) relative to the top door in the closed position.

11. The toaster oven system of claim 7, wherein the spring mechanism includes a pair of angled spring arms disposed within an interior of the top door, and connected to a spring coil disposed at a hinge area of the top door.

12. The toaster oven system of claim 11, further comprising a first cover body and a second cover body disposed adjacent and covering the spring coil at the hinge area, the first cover body configured to move inside of the second cover body when the top door is moved from the closed position to the opened position.

13. The toaster oven system of claim 1, wherein each of the front door and the top door has a glass window.

14. The toaster oven system of claim 1, further comprising a grill plate removably disposed in the cooking cavity, the grill plate having a plurality of holes configured to facilitate drainage of grease.

15. The toaster oven system of claim 14, wherein the cooking cavity includes a bottom wall, a first sidewall, and a second sidewall, the heating element disposed above the bottom wall, and each of the first sidewall and the second sidewall has guide rails configured to removably hold the grill plate in an installed position, the grill plate including stopper features configured to align and selectively engage the grill plate with the guide rails, and to permit for the grill plate to selectively disengage with the guide rails upon a manual tilting forward of the grill plate in the cooking cavity.

16. The toaster oven system of claim 15, wherein the plurality of holes in the grill plate are not disposed directly above the heating element when the grill plate is in the cooking cavity in the installed position.

17. A toaster oven system, comprising:
a main body having a cooking cavity for holding food, the main body having a front side and a top side, the front side defining a front opening of the main body, and the top side defining a top opening of the main body;

a heating element disposed in the cooking cavity;

a front door hingedly attached to the main body and movable between a closed position and an opened position, the front door sealing the front opening of the main body when in the closed position, and the front door not sealing the front opening of the main body when in the opened position;

a top door hingedly attached to the main body and movable between a closed position and an opened position, the top door sealing the top opening of the main body when in the closed position, and the top door not sealing the top opening of the main body when in the opened position;

a controller in electrical communication with the heating element and a power source, the controller configured to selectively activate and deactivate the heating element for cooking of the food in the cooking cavity when the front door is in the closed position and the top door is in the closed position; and a microswitch disposed on the main body adjacent the top opening and configured to determine when the top door is in the opened position, the microswitch in electrical communication with the controller, and the controller configured to deactivate the heating element when the microswitch determines the top door is in the opened position, wherein each of the front door and the top door has a glass window, wherein the top door has an axle protrusion and the main body has a receiver sleeve, the receiver sleeve configured to receive the axle protrusion of the top door and to permit for movement of the top door from the closed position to the opened position, the axle protrusion has an axle stopper and the receiver sleeve has a receiver stopper, the axle stopper and the receiver stopper configured to together militate against movement of the top door in the opened position more than seventy degrees (70°) relative to the top door in the closed position, and wherein the food is insertable or removable through either the front opening or the top opening when an associated one of the front door and the top door is in the opened position.

18. A method for cooking food, comprising:
providing a toaster oven system, including
- a main body having a cooking cavity for holding the food, the main body having a front side and a top side, the front side defining a front opening of the main body, and the top side defining a top opening of the main body,
- a heating element disposed in the cooking cavity,
- a front door hingedly attached to the main body and movable between a closed position and an opened position, the front door sealing the front opening of the main body when in the closed position, and the front door not sealing the front opening of the main body when in the opened position, and
- a top door hingedly attached to the main body and movable between a closed position and an opened position, the top door sealing the top opening of the main body when in the closed position, and the top door not sealing the top opening of the main body when in the opened position,
- wherein the food is insertable or removable through either the front opening or the top opening when an associated one of the front door and the top door is in the opened position,
- wherein the top door has an axle protrusion and the main body has a receiver sleeve, the receiver sleeve configured to receive the axle protrusion of the top door and to permit for movement of the top door from the closed position to the opened position, and the axle protrusion has an axle stopper and the receiver sleeve has a receiver stopper, the axle stopper and the receiver stopper configured to together militate against movement of the top door in the opened position more than seventy degrees (70°) relative to the top door in the closed position;

moving at least one of the front door and the top door to the opened position;

inserting the food through at least one of the front opening and the top opening;

moving each of the front door and the top door to the closed position;

raising a temperature within the cooking cavity, using the heating element, to a predetermined cooking temperature to cook the food;

opening each of the front door and the top door; and removing the food from the cooking cavity.

* * * * *